Patented Mar. 3, 1936

2,033,103

UNITED STATES PATENT OFFICE 2,033,103

PROCESS FOR MAKING GLASS, ENAMELS, GLAZES, AND THE LIKE CONTAINING LEAD

Paul Beyersdorfer, Reichenbach, Germany

No Drawing. Application March 16, 1932, Serial No. 599,354. In Germany May 20, 1931

16 Claims. (Cl. 106—36.1)

This invention relates to a process of manufacturing lead-containing glass, enamels and glazes and to a product used in such process.

In prior art processes of manufacturing lead-containing glass (which latter term includes in its wider aspect frits, enamels and glazes, such as are used for example in the various branches of the ceramic industry), the lead is introduced into the glass-forming mixture, the so-called batch of mixed raw materials in the form of various lead compounds. Most frequently the lead is used in the form of minium ($Pb_3O_4$). It is also possible to use lead monoxide (PbO). However, there is then always the danger of a dark glass being obtained owing to the reduction of lead by any organic substances that may be present.

Since minium is always somewhat high in price attempts have been made to replace it by lead sulphate. This however, requires great care since, inasmuch as an addition of carbon material is necessary, such as coal, some lead is easily reduced and the glass blackened as a result.

It is also known to use naturally occurring or commercially prepared compounds, such as for example lead sulphide (PbS), lead sulphate ($PbSO_4$) and lead carbonate.

An object of the present invention is the provision of a new method of manufacturing lead-containing glass, enamels and glazes which is less expensive and more effective than methods used heretofore.

The above and other objects of this invention may be realized by adding substantially all of the lead ingredients in metallic form together with an oxidizing agent having such an amount of oxygen and being added in such quantity that substantially all of the introduced metallic lead is converted into lead oxide in the course of an oxidizing fusion, i. e., fusion in the presence of oxidizing agents, such as, for example, nitrates, chlorates, peroxides or persalts.

Preferably the fused metallic lead is first of all thoroughly mixed with one of the constituents of the glass forming mixture such as the sand, which dispersion can be effected by a stirring operation carried out with a supply of air. In this way the greater part of the metallic lead oxidizes, so that an intimate mixture of lead oxide, minium, lead and sand is formed.

Such a mixture, or a similar mixture, can be used as an intermediate product for the production of lead-containing glasses, glazes, enamels and the like.

The use of metallic lead instead of the lead compounds generally used in prior art has disclosed the very surprising fact that quite new properties and effects, such as for example colourings, can be produced in this manner. More particularly it has been found that ferrous oxide glasses, which are used as heat-resisting glasses, are coloured more intensively than when lead compounds are used.

This depends on the fact that the reduction capability of the glass-forming mixture containing lead can come into effect. In this way the utility of such heat-resisting glasses is substantially raised.

Since the lead is contained in the resulting glass in the form of PbO, the metallic lead must be oxidized to lead oxide in the course of the fusion process. This is quantitively effected by introducing the alkalis and alkaline earths, which, when minium or litharge is used, are generally in the form of carbonates, in stoichiometrical proportion, for example in the form of nitrates.

When litharge and potash are used the reaction in the molten glassy mixture takes place substantially in accordance with the following formula:

(I) 
$x\,PbO + y\,K_2CO_3 = x\,PbO \cdot y\,K_2O + y\,CO_2$

When lead and potassium nitrate are used, however, the reduction proceeds thus:

(II) 
$x\,Pb + 2y\,KNO_3 = x\,PbO \cdot y\,K_2O + y\,N_2O_4 + 50$ kg. cals.

The same glass constituents are formed in each case, but the gas which escapes is different, being carbon dioxide in the first case and nitrogen tetroxide in the second case.

Further, the reaction according to Equation II takes place with a considerable evolution of heat, viz., 50 kg. cals. per gram molecule, as a result of which a more speedy fusion of the glass-forming mixture takes place.

The glass mixture in the heretofore known processes contains the lead and the alkalis in the following forms and proportions (parts by weight):

40 parts of minium, 25 parts of calcined potash, 3 parts of potassium nitrate.

The proportion of the remaining constituents of the glass-forming mixture can be changed according to the purpose in view.

According to the present invention, instead of 40 parts of minium, 36.6 parts of metallic lead are used. This requires 17.9 parts of potassium nitrate for the oxidation of metallic lead to lead monoxide. Since 3 parts of potassium nitrate are already contained in the glass-forming mixture, 14.9 parts of potassium nitrate must be added instead of the potash.

The 14.9 parts of potassium nitrate are equivalent to 10.2 parts of calcined potash as regards the $K_2O$ content.

Therefore, the new glass-forming mixture of glass constituents in order to be equivalent to the above-described mixture known in prior art, must have the following composition: 36.6 parts of metallic lead, 17.9 parts of potassium nitrate and 14.8 parts of calcined potash.

If the present day prices are borne in mind the mixture prepared according to the prior art process is about 50 per cent. more expensive than the mixture according to the invention. The economical superiority of the new process is readily apparent therefore.

A further advantage of the new process is apparent during the melting down of different crystal glasses. The glasses, without any addition of decolourizing agents are optically much purer than those in which the lead has been introduced, e. g. in the form of minium. The new process therefore is accompanied by a saving in decolourizing agents which, as in the case of selenium and selenium compounds, are somewhat expensive. Furthermore the process affords crystal glasses which are optically purer and consequently more valuable.

Examination has shown, and this was to be expected, that as far as the coefficients of expansion and the indices of refraction are concerned, glasses prepared by the new process show, for equivalent glass-forming mixtures, no difference whatsoever from glasses produced by the old process. The lead, generally is introduced into the glass-forming mixture in the form of scales, granules or powder, in which case the whole oxidation process takes place during the fusion. If, however, only one constituent of the mixture, such as for example the silica in the form of sand is thoroughly mixed with the fused lead, then this dispersion is preferably carried out by stirring and simultaneously supplying a certain amount of air, so that the greater part of the lead is oxidized at the same time. The quantity of alkali or alkaline earth nitrates substantially equivalent to the oxidized lead can be replaced in the glass-forming mixture by the equivalent quantities of the corresponding cheaper carbonates.

It is known to add oxides of zinc, antimony, tin, copper, nickel, iron, silver, gold and other metals to the glass-forming mixture in order to impart definite chemical and physical properties, opacities and colours to glasses, glazes, enamels and the like. This method also may be applied to the process according to this invention.

It has now been found that in this case it is more economical to use the additional metals (zinc, antimony and so forth) in its metallic form and to add those metals which will alloy with lead to the molten lead before the above described dispersion with one or several other constituents of the batch, such as sand, is produced.

The baser metals, which are found in the glass in the form of oxide, are then oxidized together with the lead during the fusion process.

*Example*

50 kg. of Hohenbockaer sand and 41 kg. of metallic lead are heated in a receptacle up to the melting point of the lead. As soon as the lead is fused the molten lead is mixed with the sand by means of a stirring arrangement.

After stirring for about 8 hours at a temperature of 400–500° C. a large portion of the lead intimately mixed with sand is oxidized to lead oxide and minium, which is indicated by the external orange colour of the sand. The resulting sand-lead mixture is passed over a magnetic separator in order to remove any iron particles which may be present and then mixed in a rotating drum with 10 kgs. of potash, 10 kgs. of barium carbonate, 6 kgs. of potassium nitrate and small quantities of arsenic. The mixture is then introduced in the glass-making tanks and can be worked up when the oxidizing fusion is completed. By this process the dark colouring which otherwise appears in the case of lead-containing glass is completely avoided.

If the appliances and vessels used for making the sand-lead mixture do not consist of iron, or are not provided with a covering or lining which contains iron, then no particles of iron can get into the mixture so that it is not necessary to pass the mixture over a magnetic separator or like appliance for removing iron.

What I claim is:

1. In a process of manufacturing all kinds of lead-containing glass material, including glazes and enamels, adding substantially all of the lead ingredient in metallic form together with an oxidizing agent which is sufficient to convert all of said lead into lead oxide by means of an oxidizing fusion, to a glass forming mixture.

2. In a process of manufacturing all kinds of lead-containing glass material, including glazes and enamels, adding substantially all of the lead ingredient in metallic form together with nitrates to a glass-forming mixture, the amount of said nitrates being sufficient to convert all of said lead into lead oxide by means of an oxidizing fusion.

3. In a process of manufacturing all kinds of lead-containing glass material, including glazes and enamels, adding substantially all of the lead ingredient in a finely-divided metallic form together with an oxidizing agent to a glass forming mixture, said oxidizing agent converting all of said lead into lead oxide by means of an oxidizing fusion.

4. In a process of manufacturing all kinds of lead-containing glass material, including glazes and enamels, mixing fused metallic lead with at least one other ingredient of the glass, adding the resulting mixture to the remaining ingredients of the glass together with an oxidizing agent, said oxidizing agent being added in an amount sufficient to convert all the lead into oxide, and further working up to glass by an oxidizing fusion.

5. In a process of manufacturing all kinds of lead-containing glass material, including glazes and enamels, mixing fused metallic lead with at least one other ingredient of the glass by a stirring operation whilst simultaneously supplying air for the purpose of effecting a partial oxidation of the metallic lead, adding the resulting mixture to the remaining ingredients of the glass together with an oxidizing agent, said oxidizing agent being capable of oxidizing the remaining lead and further working up to glass by an oxidizing fusion.

6. In a process of manufacturing all kinds of lead-containing glass material, including glazes and enamels; adding lead in the form of a lead-containing alloy together with an oxidizing agent which is sufficient to convert all of said lead into lead oxide by means of an oxidizing fusion, to a glass forming mixture.

7. In a process of manufacturing all kinds of lead-containing glass material, including glazes and enamels; mixing a fused lead-containing alloy with at least one of the ingredients of a glass-forming mixture, adding the resulting mixture to the other ingredients of said glass-forming mixture along with an oxidizing agent, said oxidizing agent being capable of converting all the components of said lead-containing alloy into oxides, and further working up to glass by an oxidizing fusion.

8. In a process of manufacturing all kinds of lead-containing glass material, including glazes and enamels; mixing a fused lead-containing alloy with at least one of the ingredients of a glass-forming mixture by a stirring operation, simultaneously supplying air to effect a partial oxidation of the components of said lead-containing alloy, adding the resulting mixture to the other ingredients of said glass-forming mixture along with an oxidizing agent, said oxidizing agent being capable of converting all the components of said lead-containing alloy into oxides, and further working up to glass by an oxidizing fusion.

9. In a process of manufacturing all kinds of lead-containing glass material, including glazes and enamels, the step of adding sand particles covered by coatings adhering to the particles and consisting substantially of lead oxidation products to a glass-forming mixture.

10. Sand, each particle of said sand being covered by a coating adhering to said particle and consisting substantially of lead oxidation products, said coating being produced by intimately mixing a quantity of molten lead with a corresponding quantity of sand in the presence of an oxidizing gas.

11. Sand, each particle of said sand being covered by a coating adhering to said particle and consisting substantially of a lead alloy, said coating being produced by intimately mixing a quantity of a molten lead alloy with the corresponding quantity of sand.

12. Sand, each particle of said sand being covered by a coating adhering to said particle and consisting substantially of oxidation products of a lead alloy, said coating being produced by intimately mixing a quantity of a molten lead alloy with the corresponding quantity of sand in the presence of an oxidizing gas.

13. A mixture for the manufacture of all kinds of lead-containing glass material, including glazes and enamels, said mixture comprising sand particles covered by coatings adhering to the particles and consisting substantially of lead oxidation products, said coatings being produced by intimately mixing a quantity of molten lead with a corresponding quantity of sand in the presence of an oxidizing gas.

14. A mixture for the manufacture of all kinds of lead-containing glass material, including glazes and enamels, said mixture comprising sand particles covered by coatings adhering to the particles and consisting substantially of a lead alloy, said coatings being produced by intimately mixing a quantity of a molten lead alloy with the corresponding quantity of sand.

15. A mixture for the manufacture of all kinds of lead-containing glass material, including glazes and enamels, said mixture comprising sand particles covered by coatings adhering to the particles and consisting substantially of oxidation products of a lead alloy, said coatings being produced by intimately mixing a quantity of a molten lead alloy with the corresponding quantity of sand in the presence of an oxidizing gas.

16. In a process of manufacturing all kinds of lead-containing glass material, including glazes an enamels, the steps of adding sand particles covered by coatings adhering to the particles and consisting substantially of lead oxidation products to a glass-forming mixture, said coatings being produced by intimately mixing a quantity of a molten lead with a corresponding quantity of sand in the presence of an oxidizing gas.

PAUL BEYERSDORFER.